May 4, 1937.  H. L. STALEY  2,079,190
CUTTER FOR TUBE CLEANERS
Original Filed July 20, 1933

INVENTOR.
Harrison L. Staley

Patented May 4, 1937

2,079,190

UNITED STATES PATENT OFFICE 2,079,190

CUTTER FOR TUBE CLEANERS

Harrison L. Staley, Martinsville, Ind.

Original application July 20, 1933, Serial No. 681,257. Divided and this application February 2, 1935, Serial No. 4,595

1 Claim. (Cl. 15—104.14)

This invention relates particularly to cutters such as are used to remove scale from the interior of boiler tubes. These cutters are carried on expanding arms or wings of a head which is attached to a motor whereby the head is rotated rapidly, the centrifugal action of the arms or wings forcing the cutters outwardly whereby their pounding and radial cutting or chopping action removes the scale from the tube wall. Such cutters are free to rotate on their own axis.

This application is a division of my application, Serial No. 681,257 filed July 20, 1933, now Patent No. 2,015,973, Oct. 1, 1935.

One objection of cutters which have been used heretofore is, that the cutters have teeth which are spaced regularly. Such cutters by their rotation form teeth in the surface of the scale on which they rotate. This action seriously interferes with their effectiveness.

The purpose of my invention is to provide a cutter in which the tendency to track is effectively overcome due to a peculiar arrangement of the teeth of the cutters. Also to provide a cutter whereby its manufacture can be greatly expedited, in that it can be formed by the same tool, there being no necessity to change tools to form teeth of different pitches.

In the views, similar letters of reference indicate corresponding parts.

Figure 1:
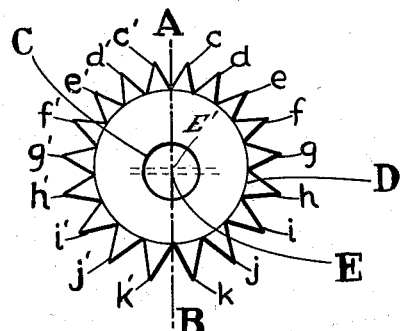
Fig. 1 is an end view of the plain or cylinder cutter.
Figure 2:
Fig. 2 is a side elevation of the cutter shown in Fig. 1.

Fig. 1 denotes a cutter of the class described. It has a body the cross-section of which has an outer cylindrical form. The outer cylindrical form applies both to the cutter shown in Fig. 1 and also the cutter shown in Fig. 3. There are V-shaped teeth, $c$, $d$, $e$, $f$, $g$, $h$, $i$, $j$, $k$, $c'$, $d'$, $e'$, $f'$, $g'$, $h'$, $i'$, $j'$, and $k'$ in the periphery, and a hole C which is formed concentric to the periphery.

It is observed that the teeth of said cutter have a progressive difference of spacing as well as size on either side of the central line A, B. Thus the space between the points of the teeth $c$—$d$, $d$—$e$, $e$—$f$, $f$—$g$, $g$—$h$, $h$—$i$, $i$—$j$, and $j$—$k$ have progressively enlarged spaces in the order in which they are enumerated, due to the fact that in manufacture the axis E of rotation of a cutter blank is set eccentrically to the forming tool. The base line D of the teeth is therefore eccentric to the axis E of rotation of the cutter. The cutter is practically formed by having pairs of teeth of the same pitch diameter, one on either side of the central line A, B in corresponding like position as $c$ to $c'$, $d$ to $d'$, $e$ to $e'$, $f$ to $f'$, $g$ to $g'$, $h$ to $h'$, $i$ to $i'$, $j$ to $j'$, $k$ to $k'$.

Figure 3:
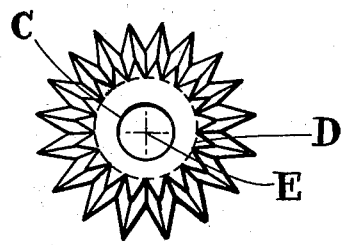
Fig. 3 is an end view of a frusto-conical cutter.
Figure 4:
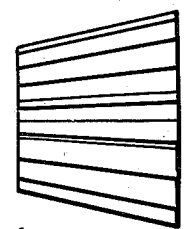
Fig. 4 is a side elevation of the frusto-conical cutter.

In Fig. 3, the cutter which is a frusto-conical cutter is formed in the same manner save only, that the axis of said cutter while it is being formed is set at an angle to the forming tool.

In operation, these cutters which are made in various diameters and widths to suit the cutting head on which they are mounted, cannot strike twice in the scale at the same point, by reason of the fact, that the points of the teeth are progressively spaced and they leave unequally spaced indentations in the scale. Since there is a wide variation in the spacing it is practically impossible for the tooth points to exactly match the indentations made during a previous rotation. A very great increase in the effectiveness of cutters results. It is important that the edges of the teeth shall be shaped to remove the scale by a chopping action, and therefore the teeth as well as the spaces between the teeth are approximately V-shaped. It is important also that these chopping edges of the teeth shall all be concentric with the axial center E, and further that the base line D shall be concentric with respect to the center E', and that such center E' is eccentric with respect to the axial center E.

Figure 5:
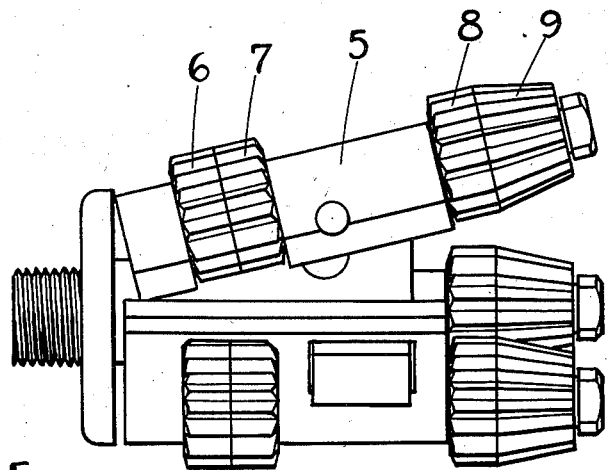
Fig. 5 is a side elevation of a tube cleaner embodying my invention.

In Fig. 5 is shown how cutters of Figs. 1 and 3 are mounted on a cutting head of conventional form. Cutters, Fig. 1, indicated by numerals 6, 7, and 8 are shown in a frame or wing 5 which is in a half expanded position. A cutter, Fig. 3, is mounted in said wing 5 and is indicated by the numeral 9.

It is understood of course, that I am not bound by my invention to tube cleaners as these cutters are readily adapted to the dressing of abrasive wheels and the like.

I claim as new:

A tube-cleaning cutter for use in that type of cleaning device wherein the cutter is mounted to revolve around an axis and is also mounted to rotate about its own axis for rolling and chopping engagement with tube deposit, said axes being substantially parallel, the cutter comprising a cylindrical body with a round centrally located axle hole and a series of peripheral chopping teeth spaced around its axis and extending longitudinally of the cutter axis along the full width of the periphery of the cutter for radial penetration of the tube deposit, characterized in that the teeth are of V-shaped profile, the opposite sides of each of said teeth being of equal extent and converging outwardly to form a cutting edge, their crests are equidistant from the axis of the cutter, the included angle of the tooth profile is the same in all of the teeth in the series, the profile of each tooth is symmetrical with respect to a radius from the axis of rotation of the cutter, and the pitch of the tooth crests and the depth of the teeth of the series both increase progressively and uniformly from one point on the periphery of the cutter in opposite directions around the periphery to a diametrically opposite point, whereby the base circle of said teeth is eccentric with respect to said axle and said cutting edges.

HARRISON L. STALEY.